(12) United States Patent
Kistler et al.

(10) Patent No.: US 7,114,682 B1
(45) Date of Patent: Oct. 3, 2006

(54) SYSTEM AND METHOD FOR TRANSPORTATION AND STORAGE OF CARGO IN SPACE

(76) Inventors: Walter P. Kistler, 11423 Red-Wood Rd. NE., Redmond, WA (US) 98052; Robert A. Citron, 14907 19th Ave. SE., Mill Creek, WA (US) 98012; Thomas C. Taylor, 3705 Canyon Ridge Arc, Las Cruces, NM (US) 88011

(*) Notice: Subject to any disclaimer, the term of this patent is extended or adjusted under 35 U.S.C. 154(b) by 159 days.

(21) Appl. No.: 10/862,604

(22) Filed: Jun. 7, 2004

Related U.S. Application Data

(60) Provisional application No. 60/545,711, filed on Feb. 18, 2004.

(51) Int. Cl.
*B64G 1/64* (2006.01)

(52) U.S. Cl. .................. 244/172.2; 244/172.5

(58) Field of Classification Search ............ 244/158.1, 244/159.4, 159.6, 171.7, 172.2, 172.4, 172.5, 244/173.1
See application file for complete search history.

(56) References Cited

U.S. PATENT DOCUMENTS

| | | | |
|---|---|---|---|
| 4,044,974 A | | 8/1977 | Lingley et al. |
| 4,079,904 A | * | 3/1978 | Groskopfs et al. ........ 244/172.5 |
| 4,298,178 A | * | 11/1981 | Hujsak .................... 244/172.5 |
| 4,300,737 A | | 11/1981 | Byrne et al. |
| 4,324,374 A | | 4/1982 | Wittmann et al. |
| 4,471,926 A | | 9/1984 | Steel |
| 4,609,169 A | | 9/1986 | Schweickert et al. |
| 4,637,447 A | | 1/1987 | Frank et al. |
| 4,664,343 A | | 5/1987 | Lofts et al. |
| 4,679,752 A | | 7/1987 | Wittmann et al. |
| 4,699,339 A | * | 10/1987 | Rosen et al. ............ 244/172.2 |
| 4,725,023 A | * | 2/1988 | Shiki ...................... 244/158.1 |
| 4,771,971 A | | 9/1988 | Ludwig et al. |
| 4,775,120 A | | 10/1988 | Marwick |
| 4,896,848 A | | 1/1990 | Ballard et al. |
| 4,964,596 A | * | 10/1990 | Ganssle et al. .......... 244/172.5 |
| 5,092,545 A | | 3/1992 | Butterfield et al. |
| 5,141,181 A | | 8/1992 | Leonard |
| 5,158,249 A | | 10/1992 | Uphoff |
| 5,199,672 A | * | 4/1993 | King et al. ............... 244/173.3 |
| 5,299,764 A | * | 4/1994 | Scott ....................... 244/172.5 |
| 5,305,970 A | | 4/1994 | Porter et al. |
| 5,429,328 A | | 7/1995 | Dobbs et al. |
| 5,582,366 A | * | 12/1996 | Hamant et al. ......... 244/135 A |
| 5,816,539 A | | 10/1998 | Chan et al. |
| 5,826,825 A | | 10/1998 | Gabriel |
| 6,059,233 A | | 5/2000 | Koppel et al. |

(Continued)

OTHER PUBLICATIONS

Cady et al., "Cryogenic Propellant Management Architectures To Support The Space Exploration Initiative", AIAA-90-3713, Sep. 1990, 11 pages.

(Continued)

*Primary Examiner*—Galen Barefoot
(74) *Attorney, Agent, or Firm*—Greenblum & Bernstein, P.L.C.

(57) ABSTRACT

A system for transportation and storage of cargo in space includes one or more platforms. The platforms are operable to hold multiple removable propellant tanks and rendezvous with one or more other platforms in space. The platforms also include one or more thruster systems and positioners. Each positioner has an effector operable to grip a band disposed around each propellant tank. Each positioner is operable to facilitate the transfer of the multiple removable propellant tanks between platforms during the rendezvous.

64 Claims, 14 Drawing Sheets

U.S. PATENT DOCUMENTS

| | | | |
|---|---|---|---|
| 6,138,951 A * | 10/2000 | Budris et al. | 244/173.3 |
| 6,322,023 B1 * | 11/2001 | Soranno et al. | 244/159.4 |
| 6,360,994 B1 | 3/2002 | Hart et al. | |
| 6,385,512 B1 | 5/2002 | Belbruno | |
| 6,481,670 B1 | 11/2002 | Bigelow et al. | |
| 6,557,803 B1 | 5/2003 | Carpenter et al. | |
| 6,568,639 B1 | 5/2003 | Carpenter et al. | |
| 6,612,522 B1 | 9/2003 | Aldrin et al. | |
| 6,666,409 B1 | 12/2003 | Carpenter et al. | |
| 6,669,148 B1 | 12/2003 | Anderman et al. | |
| 6,679,454 B1 * | 1/2004 | Olsen et al. | 244/137.1 |
| 6,739,555 B1 | 5/2004 | Mazanek et al. | |
| 2002/0079407 A1 | 6/2002 | Lounge et al. | |

OTHER PUBLICATIONS

Hodge, "Space Transfer Vehicles For The Space Exploration Initiative", AIAA-92-1418, Mar. 1992, 9 pages.

NASA Brochure "The Vision For Space Exploration", dated Feb. 2004, 32 pages.

NASA Synopsis "Exploration Systems Enterprise Request For Information", dated Apr. 21, 2004, 10 pages.

* cited by examiner

SYSTEM AND METHOD FOR TRANSPORTATION AND STORAGE OF CARGO IN SPACE

RELATED APPLICATIONS

This application claims the benefit of U.S. Provisional Application Ser. No. 60/545,711 entitled "Lunar Transportation Vehicle System," filed Feb. 18, 2004.

TECHNICAL FIELD OF THE INVENTION

The present invention relates to space transportation systems, and more particularly to a system and method for transportation and storage of cargo in space.

BACKGROUND OF THE INVENTION

The transportation of cargo between locations in space and the maintenance of a suitable support platform in orbit can be very expensive. This high cost may create a barrier to commercial space transportation hardware development and limit the investment of private capital in technologically viable space ventures. Transportation of cargo in space accounts for approximately one-half the cost of a typical space venture. More affordable space cargo transportation platforms could lead to the increased commercialization of space.

SUMMARY OF THE INVENTION

In one embodiment, a system for transportation and storage of cargo in space, includes one or more platforms. The one or more platforms are operable to hold multiple removable propellant tanks and rendezvous with one or more other platforms in space. The one or more platforms also include one or more positioning means coupled to the one or more platforms. Each positioning means has an effector operable to grip a band disposed around each propellant tank. Each positioning means is operable to facilitate the transfer of the multiple removable propellant tanks between platforms during the rendezvous.

In another embodiment, a method is provided for the transportation and storage of cargo in space. The method includes holding multiple removable propellant tanks on one or more platforms, rendezvousing a first platform with a second platform in space, and coupling the first and second platforms using a coupling device. The method further includes gripping a band disposed around at least one of the multiple removable propellants tank using an effector of a positioning means coupled to at one of the first or second platforms, transferring the propellant tank from the first platform to the second platform, and coupling the propellant tank to the second platform.

Technical advantages of one or more embodiments of the present invention may include the ability to transfer propellant tanks from one space-based platform to another space-based platform. Another technical advantage includes the ability to modify a platform with additional components to achieve additional platform functionality. Yet another technical advantage of one embodiment is the ability to couple multiple platforms together to form a transportation node.

Certain embodiments may provide all, some, or none of these technical advantages. Certain embodiments may provide one or more other technical advantages, one or more of which may be readily apparent to those skilled in the art from the figures, description, and claims included herein.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Reusable Launch Vehicles (RLVs) offer affordability in the transportation of cargo into orbit RLVs have emerged in the transportation cycle from the earth's surface to low earth orbit. These RLVs offer initial transportation, potentially lower costs, deployment services, check out of orbital hardware, reboost and platform upgrades/degrades plus later disposal. One embodiment of the present invention is a new type of reusable vehicle. The system of the present invention may include RLV hardware for lunar transportation, communications network equipment, deployable storage platform structures, advanced robotics, solar arrays and unmanned evolution, which may be used the development of the moon.

The increased demand for space transportation has given rise to larger vehicles, more transportation capability, more capable customer sensitive payloads, and increased cost. Commercial space transportation requires new, innovative hardware, private financing, and an acceptable return on the public and private investment required to fund space ventures. Salvaged launch hardware and deployable structures offer options for affordable structures in orbit by being stowed in a launch vehicle during launch and expanding in orbit or salvaged and reused, taking advantage of the previous transportation investment.

The commercial transportation and storage platform of certain embodiments of the present invention takes payloads in earth orbit and places them on the moon where they are used for a variety of purposes.

Figure 1:
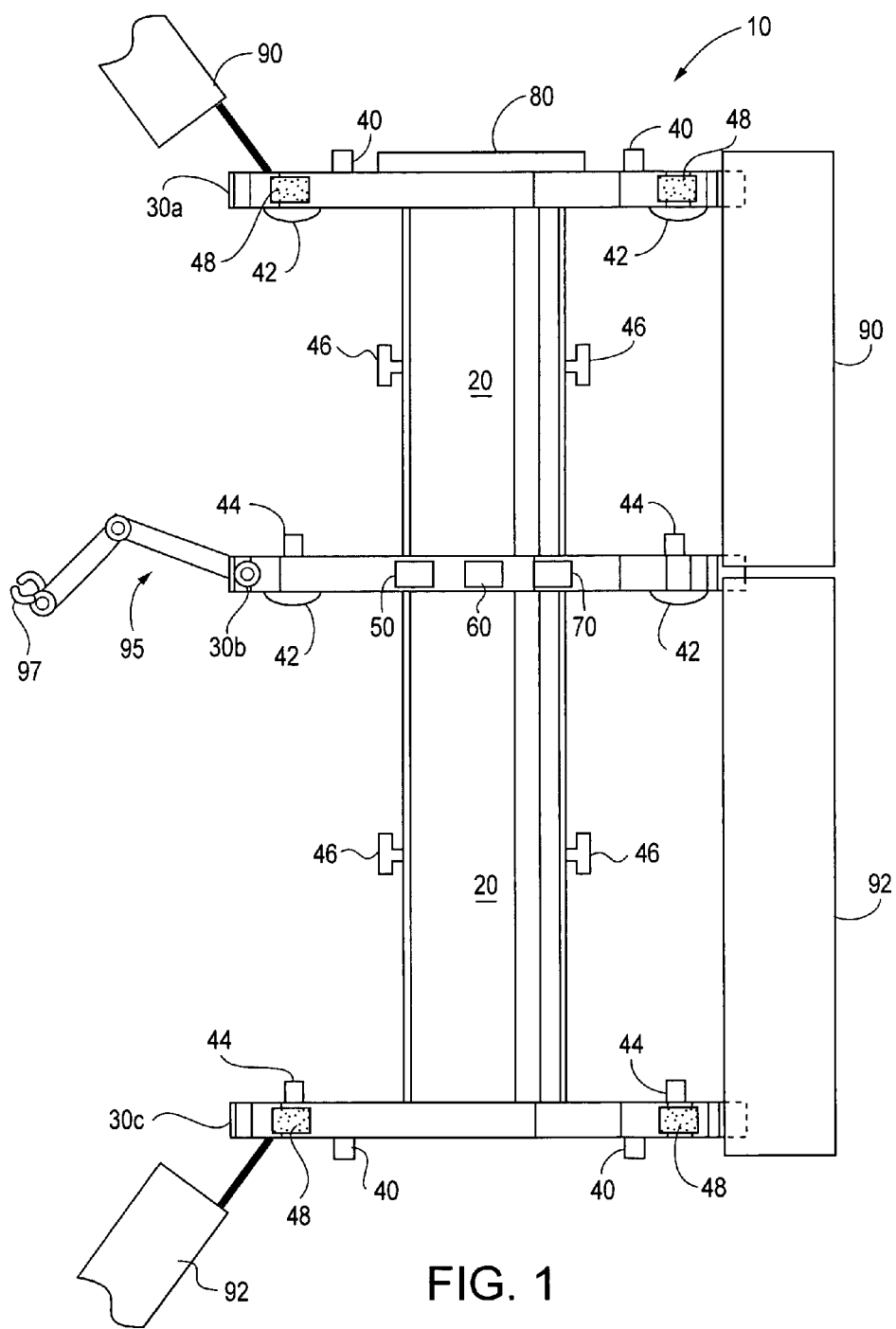
FIG. 1 illustrates an example platform for transportation and storage of cargo in space.

FIG. 1 illustrates an example platform 10 for transportation and storage of cargo in space. Platform 10 includes a central structure 20 and three frame structures 30. In certain embodiments, central structure 20 may be a cylindrical structure made from any appropriate material, such as a lightweight metal alloy. Frames 30 may be substantially circular "disks" coupled to central structure 20. For example, in some embodiments, frames 30a and 30c may be coupled to opposing ends of central structure 20 and frame 30b may be coupled to central structure 20 at any appropriate location between frames 30a and 30c depending upon the size of payload to be carried on platform 10. Platform 10 may also include payload tie down points 40 to facilitate attaching payload to frames 30a and 30c of platform 10.

Figure 2A:
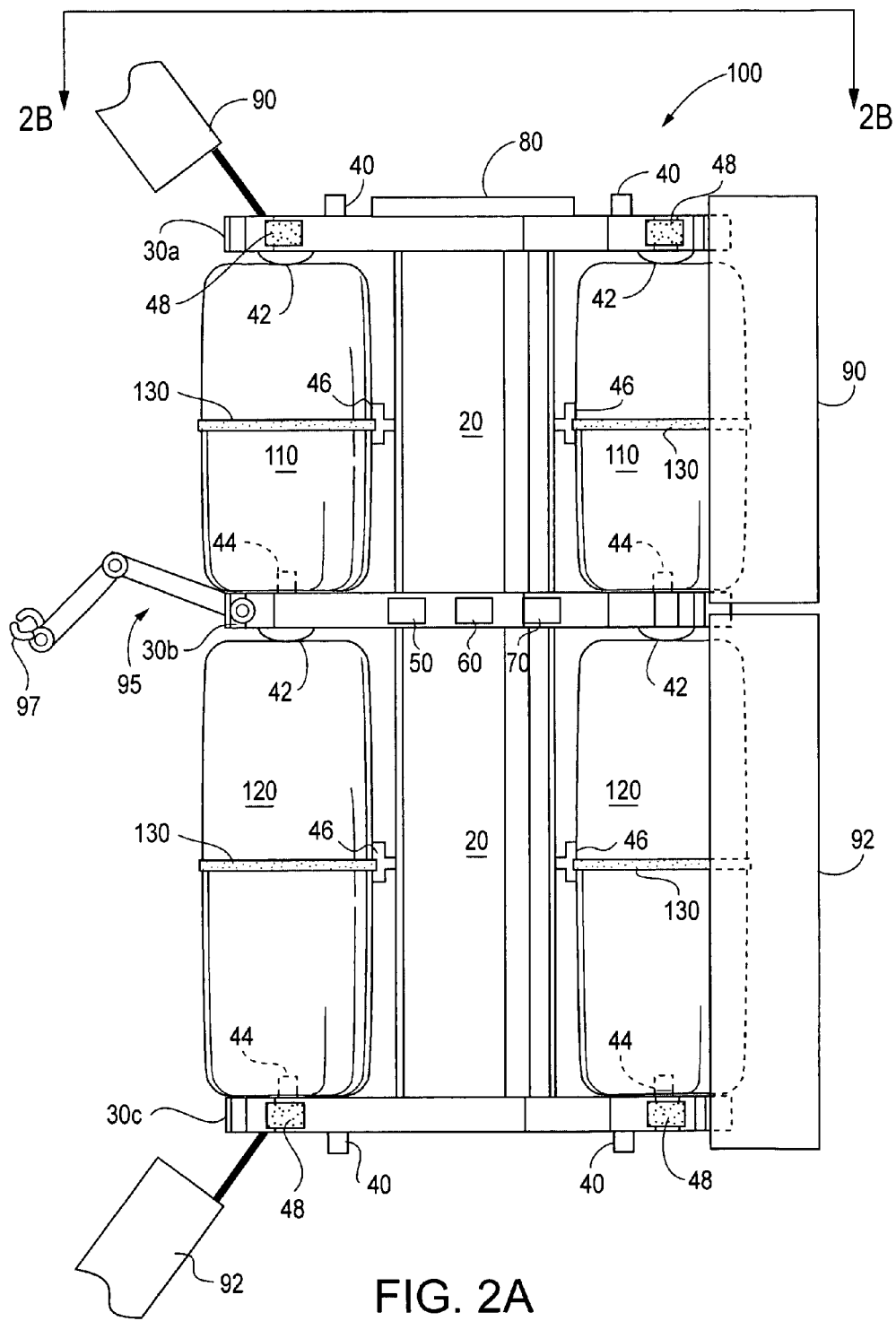
FIGS. 2A–2B illustrate an example storage platform for storing propellant tanks.
Figure 2B:
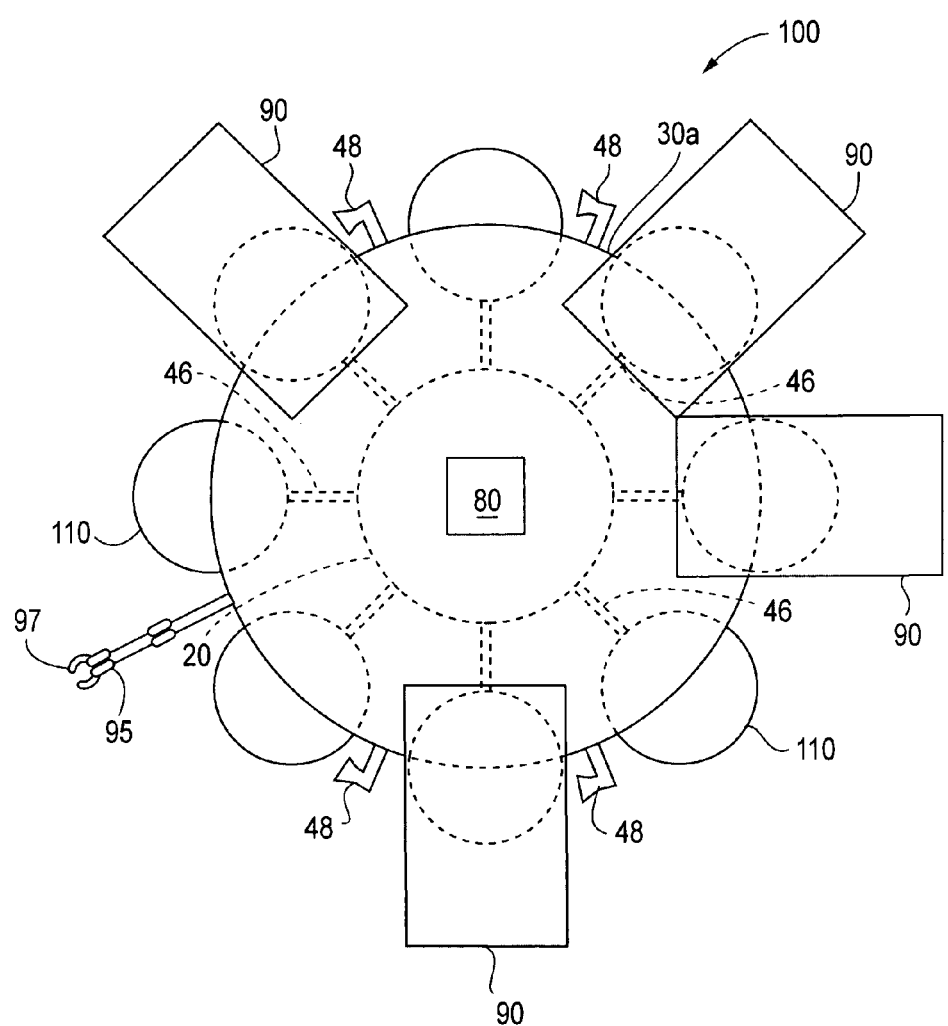

In certain embodiments, as described in more detail with respect to FIGS. 2A–2B, a platform, such as platform 10, may carry propellant tanks disposed in the openings between frames 30a, 30b, and 30c. To facilitate carrying the propellant tanks, platform 10 may include tank self-sealing penetrator nozzles 42 that are operable to exert a force upon the end of a propellant tank to hold it in place within platform 10. Platform 10 may also include transfer interfaces 44 which further facilitate the coupling of propellant tanks to frames 30b and 30c and allow for the propellant in the tanks to be transferred into or out of the tanks, as is described in further detail below. In certain embodiments, platform 10 also includes a gripper 46 that may grip and hold in place a propellant tank, as illustrated in FIG. 2A. Gripper 46 may be remotely controlled and robotically operated while platform 10 is operating in space. The operation of gripper 46 is illustrated in more detail below with respect to FIG. 7A.

Platform 10 may also include radiation shields 90, 92 that may be positioned to protect the cargo and propellants from the effects of solar radiation in space. In a particular embodiment, radiation shields 90, 92 may be made from any appropriate material. FIG. 1 illustrates shields 90, 92 retracted on the left side of platform 10 and shields 90, 92 extended on the right side of platform 10 to protect cargo, such as the propellant tanks, which may be stored between frames 30a, 30b and 30b, 30c.

In certain embodiments, platform 10 may also include a positioning means 95 having a robotic end effector 97. Positioning means 95 may be used to transfer cargo between platform 10 and other space vehicles that rendezvous with platform 10 to retrieve and/or store cargo to and/or from platform 10. Although positioning means 95 is illustrated as coupled to frame 30b, positioning means 95 may be coupled to any appropriate location platform 10. In some embodiments, multiple positioning means 95 may be coupled to platform 10.

In order to facilitate the positioning of platform 10 in various locations in the vacuum of space, platform 10 may include an attitude control system having thrusters 48. For example, platform 10 may include four thrusters 48 coupled to frame 30a and four thrusters 48 coupled to frame 30c to facilitate movement of platform 10. Thrusters, such as thrusters 48, are well know to those of skill in the art and will not be described in further detail. Platform 10 may also include batteries 50 for storing power, an electrical power sub-system 60, and a communication sub-system 70 to facilitate communications between platform 10 and a remote location, such as a mission control station. Furthermore, platform 10 may also include a solar array 80 that may be used to collect solar energy for use by the various sub-systems of platform 10.

Figure 7A:
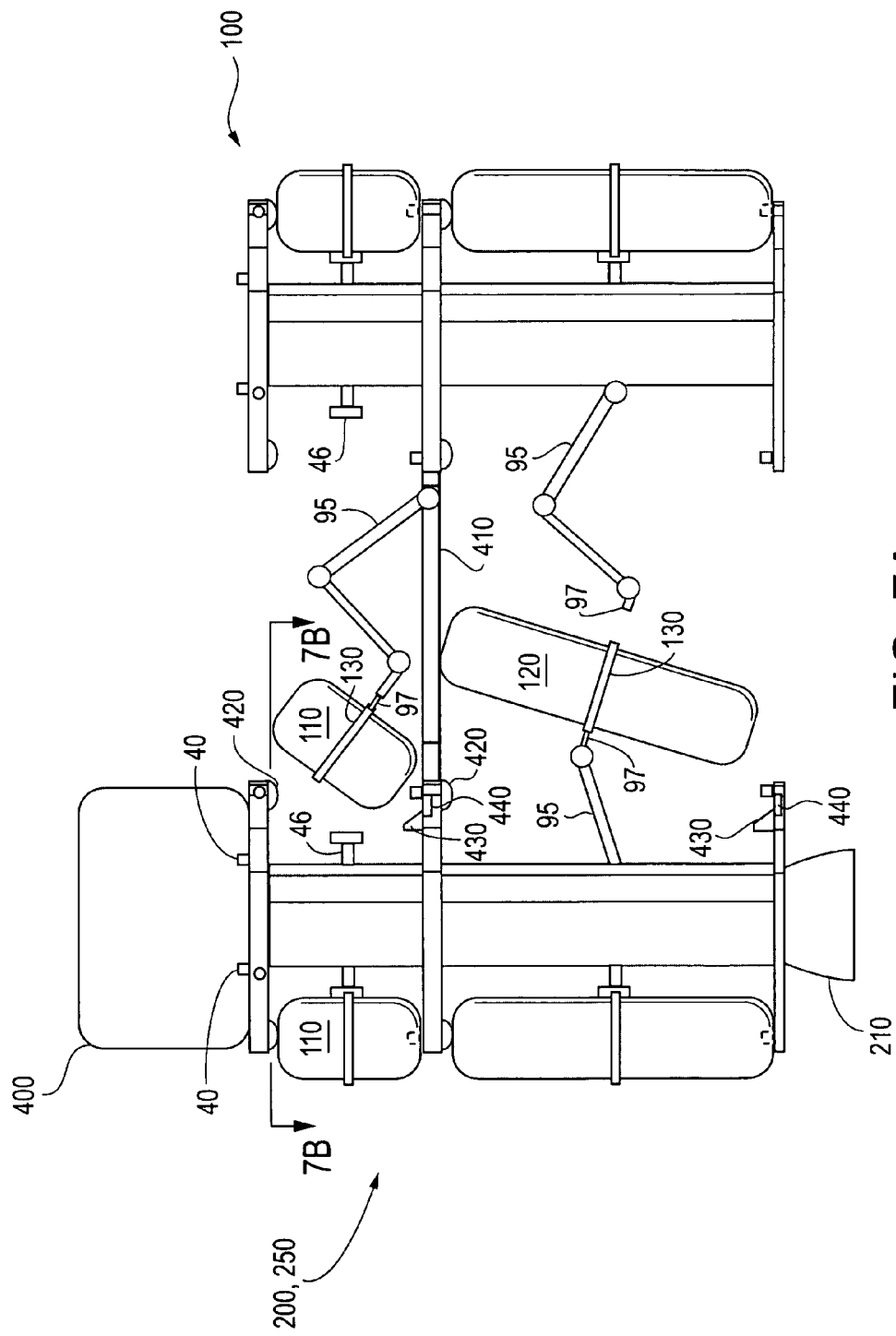
FIG. 7A illustrates a rendezvous between the storage platform of FIGS. 2A–2B and the platforms of FIGS. 4 and 5.

Platform 10 may serve as the basic component of an adaptable space transportation and storage system. For example, as illustrated in FIGS. 2A–2B, platform 10 may be used as a storage platform 100 for various cargo. FIG. 2A illustrates an example storage platform 100 for storing propellant tanks 110, 120. In certain embodiments, the weight of platform 10 may be approximately less than ten percent of the weight of the propellant contained in tanks 110, 120. In operation, platform 10 may be placed in orbit so that other space vehicles may rendezvous with platform 100 to drop-off or pick-up cargo. FIG. 7A, discussed in more detail below, illustrates an example rendezvous between a platform 100 and another space vehicle for the purposes of dropping-off or picking-up cargo. For example, platform 100 may store hydrogen propellant tanks 110 and oxygen propellant tanks 120. In certain embodiments, each propellant tank 110, 120 may comprise an aluminum cylinder that whose empty weight is approximately less than six percent of the weight of the propellant that may be contained within each tank 110, 120.

In operation, tanks 110, 120 and other cargo may be transported to low Earth orbit by a variety of launch vehicles, such as space shuttles or other launch vehicles. These launch vehicles may deploy tanks 110, 120 and other cargo in orbit near platform 10. Platform 10 may then retrieve tanks 110, 120 and other cargo using positioning means 95 and store such tanks and cargo to form storage platform 100. Tanks 110, 120 are coupled to platform 100 using self-sealing penetrator nozzles 42, transfer interfaces 44, and grippers 46 which each grip a band 130 placed around tanks 110, 120. Shields 90, 92 are show in an extended state on the right side of platform 100 to protect tanks 110, 120 from solar radiation which may cause the propellant to "boil-off" if not protected from the radiation.

In certain embodiments, as illustrated in FIG. 2B, tanks 110, 120 may be placed a various radial locations around platform 110. In a particular embodiment, platform 100 may be configured to store up to eight hydrogen tanks 110 and eight oxygen tanks 120. In alternate embodiments, platform 100 may be configured to hold any other appropriate number of tanks 110, 120. Although FIG. 2B illustrates that only certain of tanks 110, 120 are protected by radiation shield 90, 92, each tank 110, 120 may have a radiation shield 90, 92 which protects its associated tanks 110, 120 from the effects of solar radiation.

Figure 3:
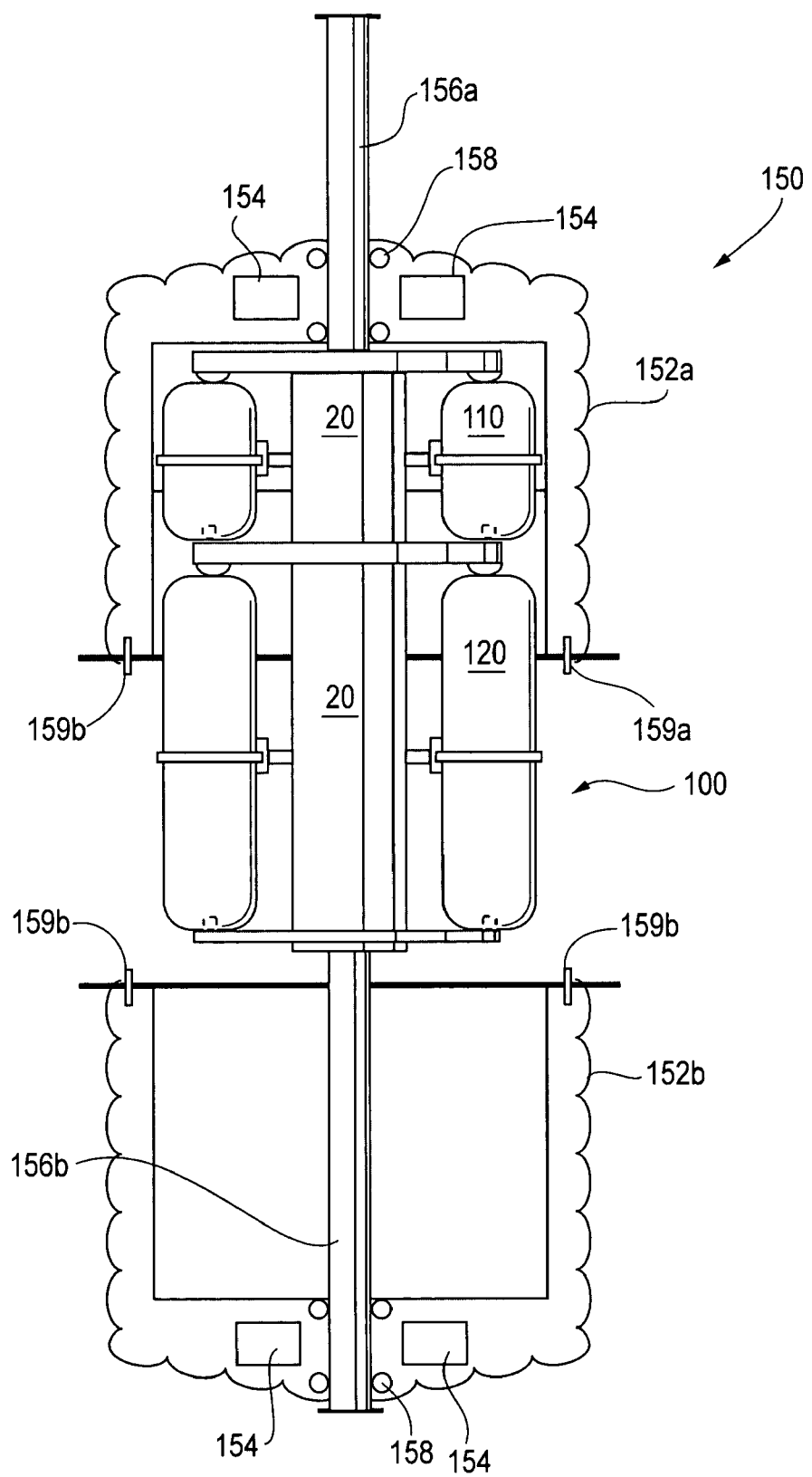
FIG. 3 illustrates an example storage platform assembly.

FIG. 3 illustrates an example storage platform assembly 150. Storage platform assembly 150 includes storage platform 100 that is covered by a protective cover 152 to protect storage platform 100 and its cargo from the drastic temperature changes that can occur in the vacuum of space. For example, in a situation where platform assembly 150 is exposed to solar radiation heating, cryogenic propellant contained in tanks 110, 120 may "boil-off" due to the high temperatures. In certain embodiments, protective cover 152 may provide protection from the extreme temperature environment of space and facilitate the extended storage of cargo, such as cryogenic propellant in tanks 110, 120.

Protective cover 152 may include two sections 152a, 152b that may be retracted towards each other to provide a cover around platform 100. In certain embodiments, protective cover sections 152, 152b may be extended from each other, as illustrated in FIG. 3, to allow access to storage platform 100 and its cargo. Cover sections 152a, 152b are coupled to truss sections 156a, 156b, respectively. During an extension operation, truss sections 156a, 156b move in opposite directions through the movement of rollers or gears coupled to motors 158. During a retraction operation, motors 158 reverse direction, causing truss sections 156a, 156b, and therefore cover sections 152a, 152b, to move towards each other to enclose storage platform 100.

In certain embodiments, platform assembly 150 may include environmental control system (ECS) equipment 154 to facilitate the temperature control of storage platform 100 and its cargo within protective cover 152. In certain embodiments, ECS equipment 154 may be used to heat and/or cool platform 100 as required. In order to maintain a temperature-controlled environment within protective cover 152, seals 159a, 159b are provided which seal cover sections 152a, 152b to each other.

Figure 4:
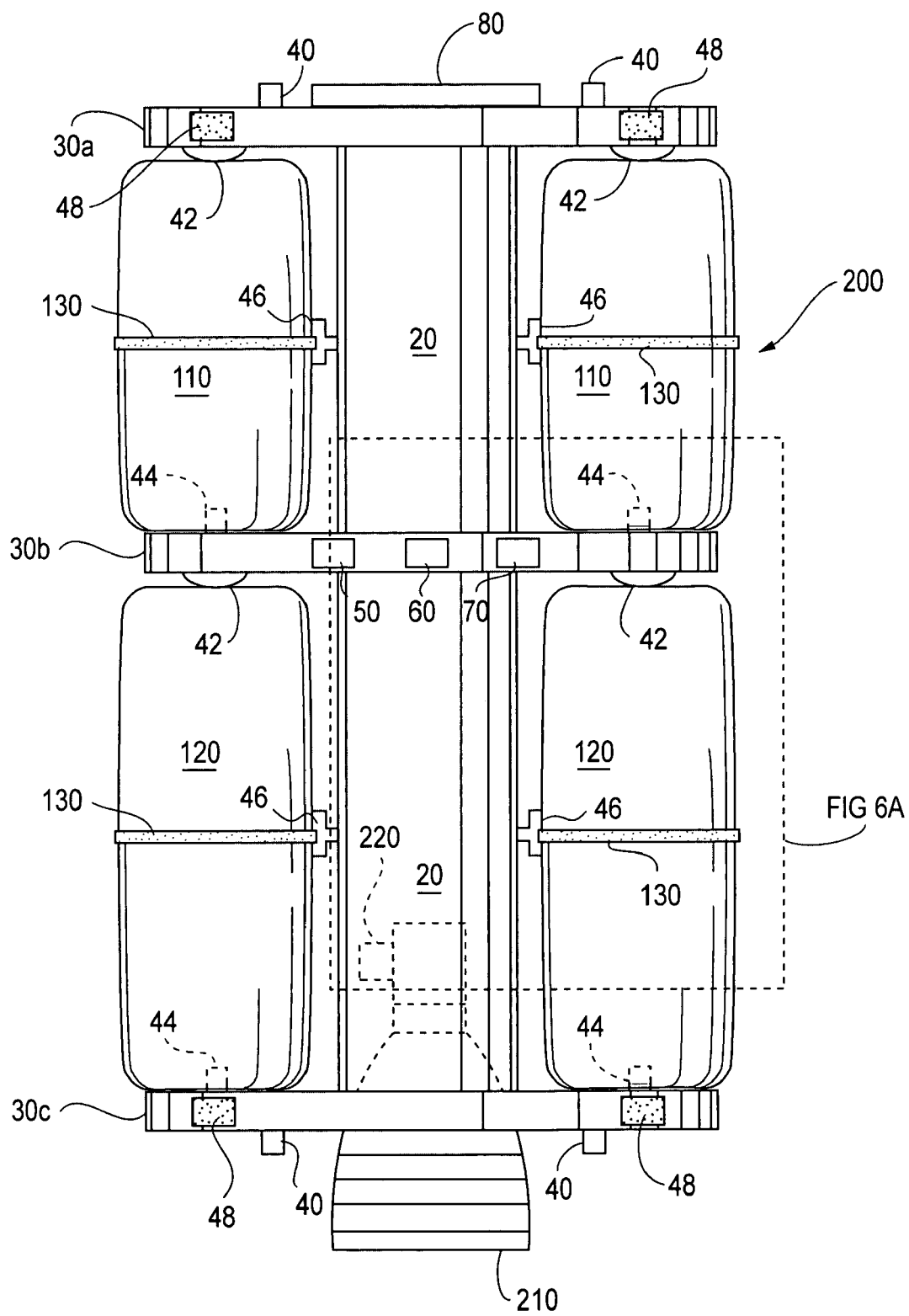
FIG. 4 illustrates an example transportation platform.

FIG. 4 illustrates an example transportation platform 200. Transportation platform 200 incorporates the basic structure of storage platforms 10, 100. Transportation platform 200 may be used to transport and store cargo, such as tanks 110, 120 in space. For example, transportation platform may be used to transport cargo from one storage platform 10, 100 to another storage platform 10, 100 or to another space vehicle, such as a space station or a space shuttle.

Figure 6A:
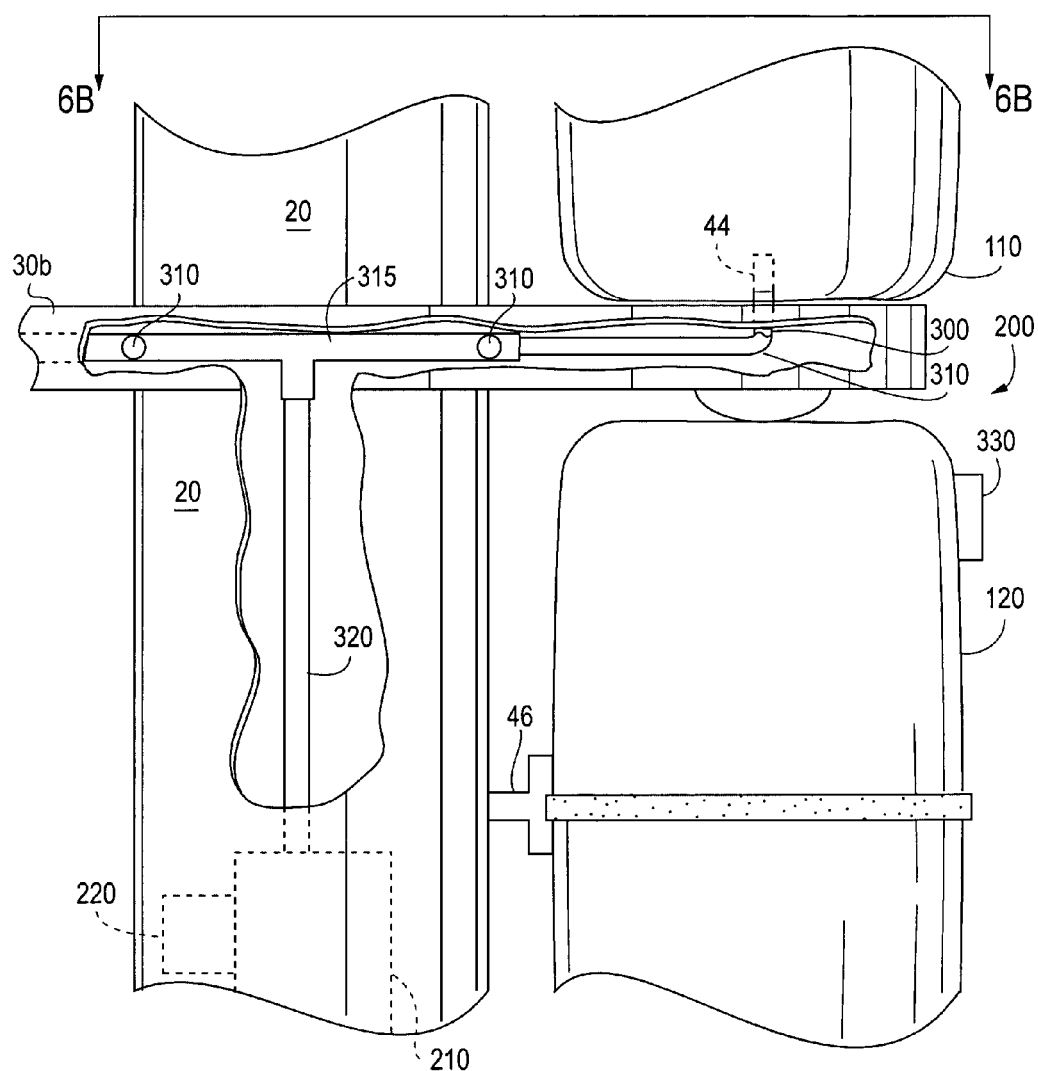
FIGS. 6A–6B illustrate details of propellant line connections between propellant tanks and a motor on the platforms of FIGS. 4 and 5.

Storage platform 10, 100 may be adaptable to be modified with additional components to create transportation platform 200. In certain embodiments, transportation platform 200 includes the components of storage platforms 10, 100, as well as a motor 210 and an auxiliary power unit 220. Transport platform is propelled through space by motor 210, which may be a gimbaled rocket motor. Motor 210 may use the propellant contained in tanks 110, 120, such as liquid oxygen and/or liquid hydrogen, as the fuel to power motor 210. In certain embodiments, motor 210 may provide thrust that is greater than approximately twice the total weight of the filled propellant tanks 110, 120 coupled to transportation platform 200. FIG. 6A, discussed in more detail below, illustrates details of the fuel connections between tanks 110, 120 and motor 210.

In certain embodiments, transport platform 200 may also use the power provided by motor 210 to power various sub-systems of platform 200, such as, for example, electrical power sub-system 60, and communication sub-system 70. For example, a take-off shaft may be coupled between motor 210 and auxiliary power unit 220, such that the power provided by motor 210 can rotate the take-off shaft, which in turn causes auxiliary power unit 220 to generate electrical power. The power generated by auxiliary power unit 220 may be used to power the various sub-systems of transport platform 200. Although positioning means 95 and radiation shields 90, 92 are not illustrated in FIG. 4, these components may also be included in the construction of transportation platform 200.

Figure 5:
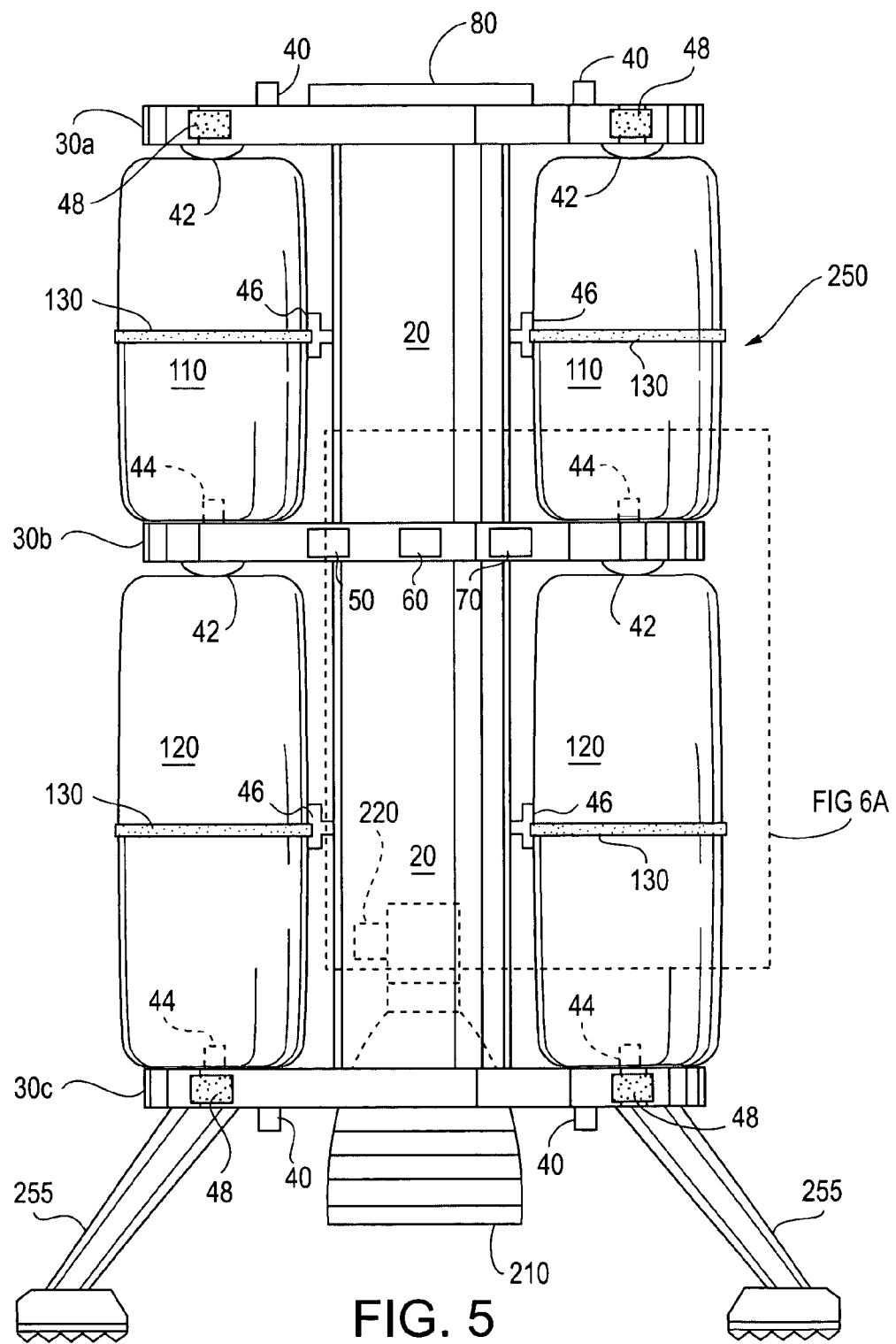
FIG. 5 illustrates an example lunar landing platform.

FIG. 5 illustrates an example lunar landing platform 250. Lunar landing platform 250 incorporates the basic structure of transportation platform 200. Lunar landing platform 250 may be used to transport tanks 110, 120 and other cargo to the surface of the moon, or to other celestial bodies. For example, lunar landing platform 250 may be used to transport cargo from a storage vehicle, such as, for example, storage platform 100, located in orbit around the earth or the moon to the surface of the moon, where such cargo may be required to supply lunar development activities. Transportation platform 200 may be adaptable to be modified with additional components to create lunar landing platform 250. In certain embodiments, lunar landing platform 250 includes the components of transportation platform 200, as well as any appropriate number of landing legs 255 to facilitate landing on the surface of the moon or other celestial body. Although positioning means 95 and radiation shields 90, 92 are not illustrated in FIG. 5, these components may also be included in the construction of lunar landing platform 250. FIG. 6A illustrates details of the fuel connections between tanks 110, 120 and motor 210.

Figure 6B:
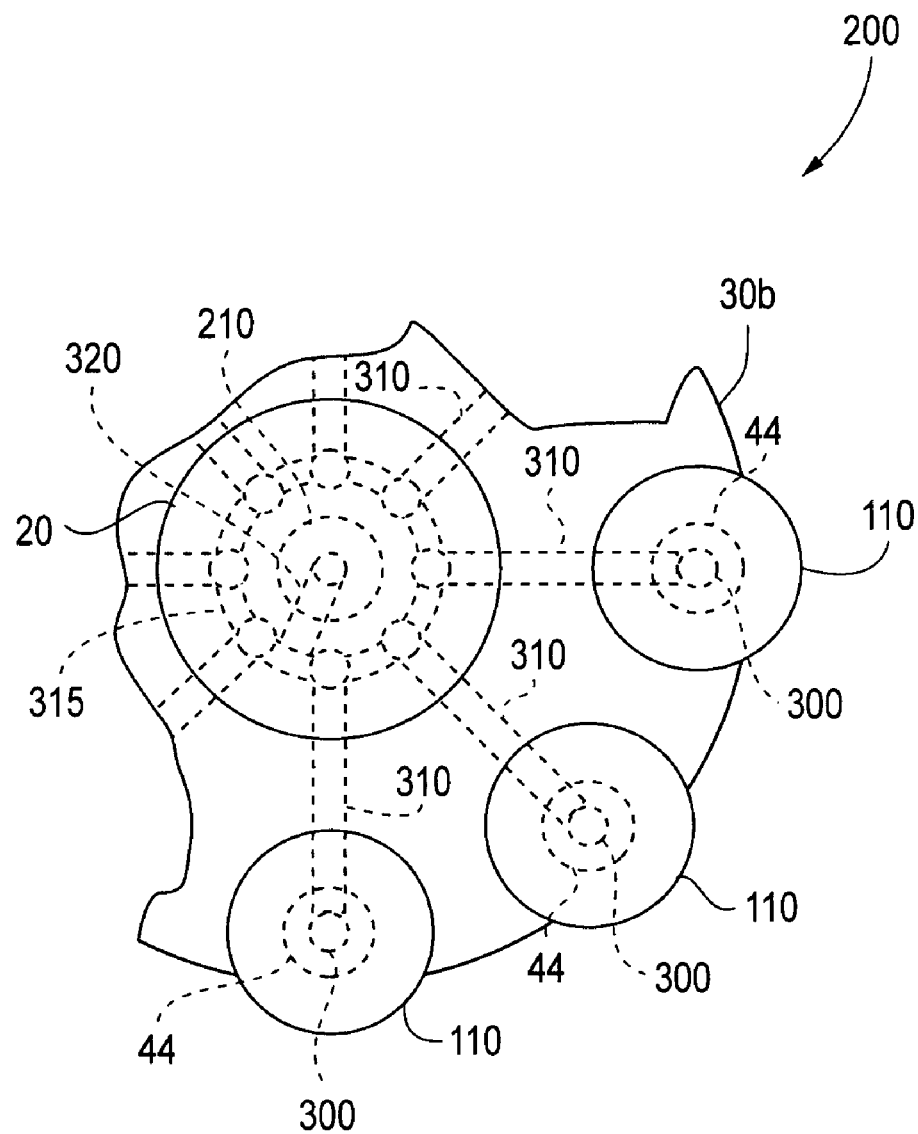

FIGS. 6A–6B illustrate details of propellant line connections between tanks 110, 120 and motor 210 on platforms 200, 250. As discussed above, propellant tanks 110, 120 are coupled to propellant transfer interface 44, using, for example, robotic remote control gripper 46. As will be discussed in more detail below, in certain embodiments, several other devices assist in the precise placement and alignment of tanks 110, 120. As illustrated in FIG. 6A, propellant line connector 300 couples transfer interface 44 to propellant line 310. Propellant lines 310 may be coupled to each tank 110, 120 on platforms 200, 250 or to a selected number of tanks 110, 120, as circumstances require. Each propellant line 310 associated with tanks 110, 120 may be coupled to motor supply line 320 via a propellant manifold 315. Tanks 110, 120 may each also include a pressurant bottle 330 and miscellaneous sensors and controls to force liquid propellants, such as hydrogen and oxygen, from tanks 110, 120 in combination with a liquid settling force created by thrusters 48 to insure that propellant flows to motor 210. FIG. 6B illustrates another view of the details of the fuel connections between tanks 110, 120 and motor 210 of transport platform 200.

FIG. 7A illustrates a rendezvous between storage platform 100 and platform 200, 250. In the illustrated embodiment, platform 200, 250 is receiving tanks 110, 120 from storage platform 100. In certain embodiments, as discussed above, platforms 100, 200, 250 may include a payload, such as payload 400, coupled to the platform via payload tie-downs 40. During the illustrated rendezvous operation, storage platform 100 and platform 200, 250 are coupled together using a coupling device 410. Remotely controlled positioning means 95, controlled from a base station such as on Earth, may transfer tanks 110, 120 from storage platform 100 to platform 200, 250 by gripping bands 130 using effector 97. Empty tanks 110, 120 retrieved from platform 200, 250 may be discarded into space or stored on storage platform 100. Although the rendezvous operation is shown between storage platform 100 and platforms 200, 250, a similar rendezvous operation may be accomplished between transportation platform 200 and lunar landing platform 250.

Figure 7B:
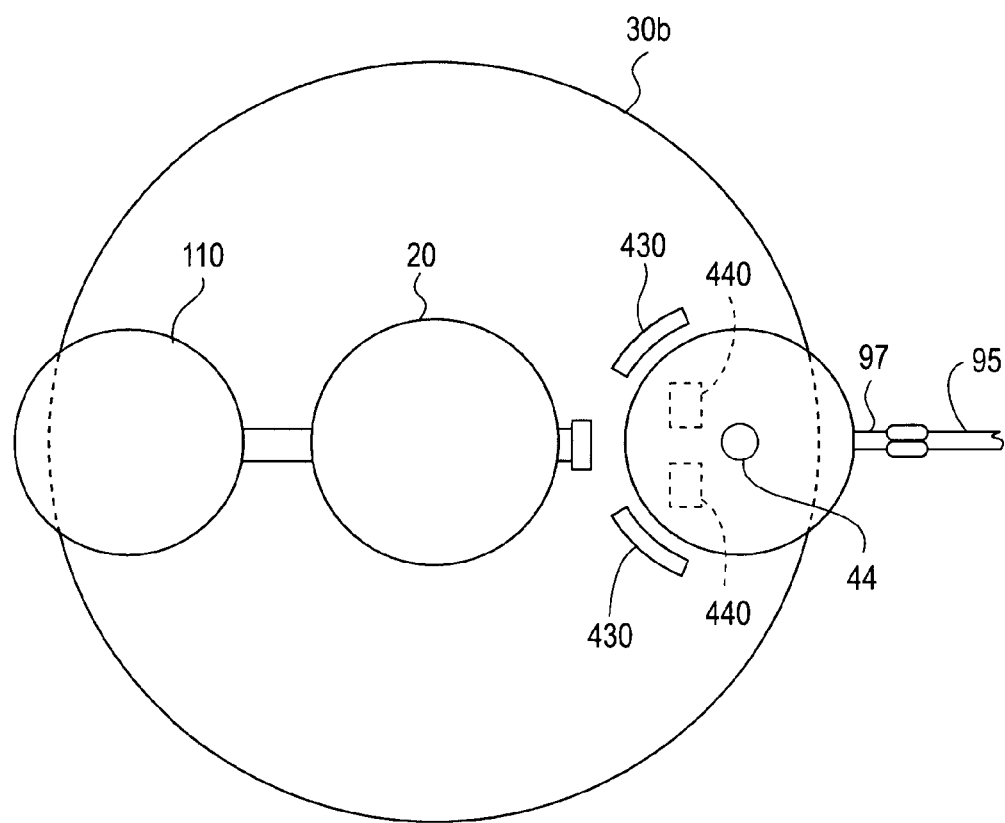
FIG. 7B illustrates the positioning of propellant tanks on the platforms of FIGS. 2–5.

In certain embodiments, the precise positioning of tanks 110, 120 on platforms 100, 200, 250 may be accomplished using a variety of directional alignment devices, as illustrated in FIG. 7B. In the illustrated embodiment, two direction alignment devices 430 align tanks 110, 120 into precise alignment with transfer interface 44. In addition, in certain embodiments, two directional movement devices 440 are located on frame 30b and further facilitate the precise positioning of tanks 110, 120 for coupling with transfer interface 44. A fine adjustment self-sealing penetrator nozzle 420, illustrated in FIG. 7A, may also be used to complete the precise adjustments that may be required to couple tanks 110, 120 with transfer interface 44. In a particular embodiment, television cameras may be mounted on platform 100, 200, 250 to facilitate the positioning of tanks 110, 120.

Figure 8:
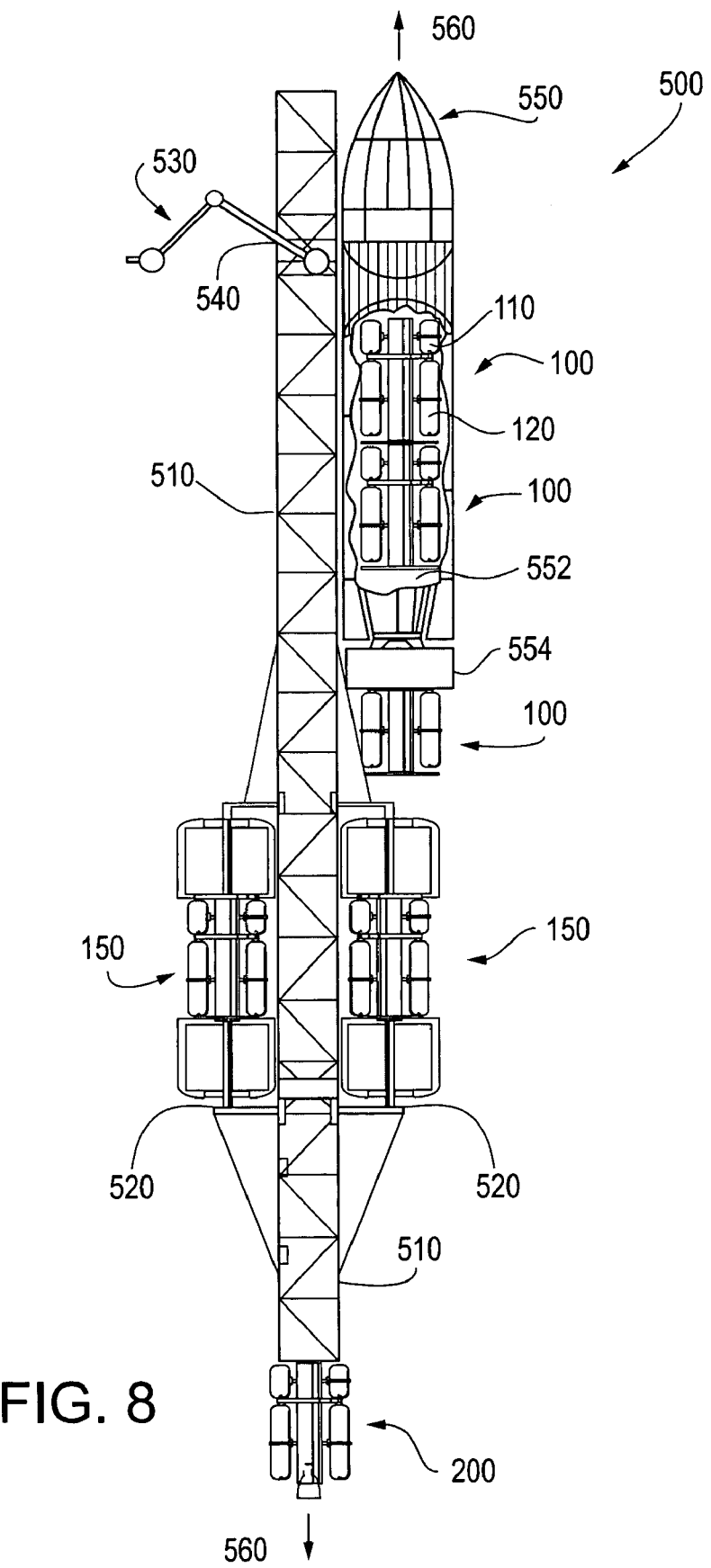
FIG. 8 illustrates an example transportation node.

FIG. 8 illustrates an example transportation node 500. Transportation node 500 may contain multiple storage platforms 100, 150 and transportation platforms 200 coupled together using a truss structure 510. Transportation node 500 may be placed at any appropriate location in space as a "warehouse" to store the cargo necessary for space travel. In certain embodiments, each platform 100, 150, 200 may be coupled to a turntable 520 which is operable to rotate the platforms 100, 150, 200 to facilitate uniform exposure of the platforms to solar radiation heating. In some embodiments, transportation node 500 may also include a positioning means 530, similar to positioning means 95 of FIG. 1, operable to couple and de-couple platforms 100, 150, 200 from transportation node 500. Positioning means 530 is coupled to a carrier apparatus 540 that is operable to move positioning means 530 up and down truss structure 510 to position positioning means 530 as desired.

Transportation node 500 may also include storage platforms 100 contained within a tank 550 to protect platforms 100 from the extreme temperature environment of space and from micrometeorites and other hazards, which contribute to propellant loss from tanks 110, 120. In certain embodiments, tank 550 may comprise a salvaged space transportation system (STS) external fuel tank, such as used to launch space shuttles. In a particular embodiment, the salvaged STS external tank 550 may provide a pressure tight volume of 53,000 cubic feet within a 100-foot long empty hydrogen tank 552 contained within external tank 550. Environmental control within tank 552 may be accomplished by using an aft cargo carrier modification package 554 for STS external tank 550. In certain embodiments, tank 552 provides a potentially longer-term storage minimum boil-off temperature for the cryogenic propellant stored in tanks 110, 120 and may provide additional mass for gravity gradient stability of transportation node 500. The length and mass of transportation node 500 provide a stable mass heavy platform, which due to gravity gradient forces will cause the long axis 560 of transportation node 500 to remain pointed toward center of the celestial body around which it orbits, such as the Earth or the moon. In certain embodiments, transportation node 500 may be provided with the necessary facilities and equipment to support a human presence on node 500. In other embodiments, transportation node may be unmanned and controlled from a remote station, such as a mission control station on earth.

Figure 9A:
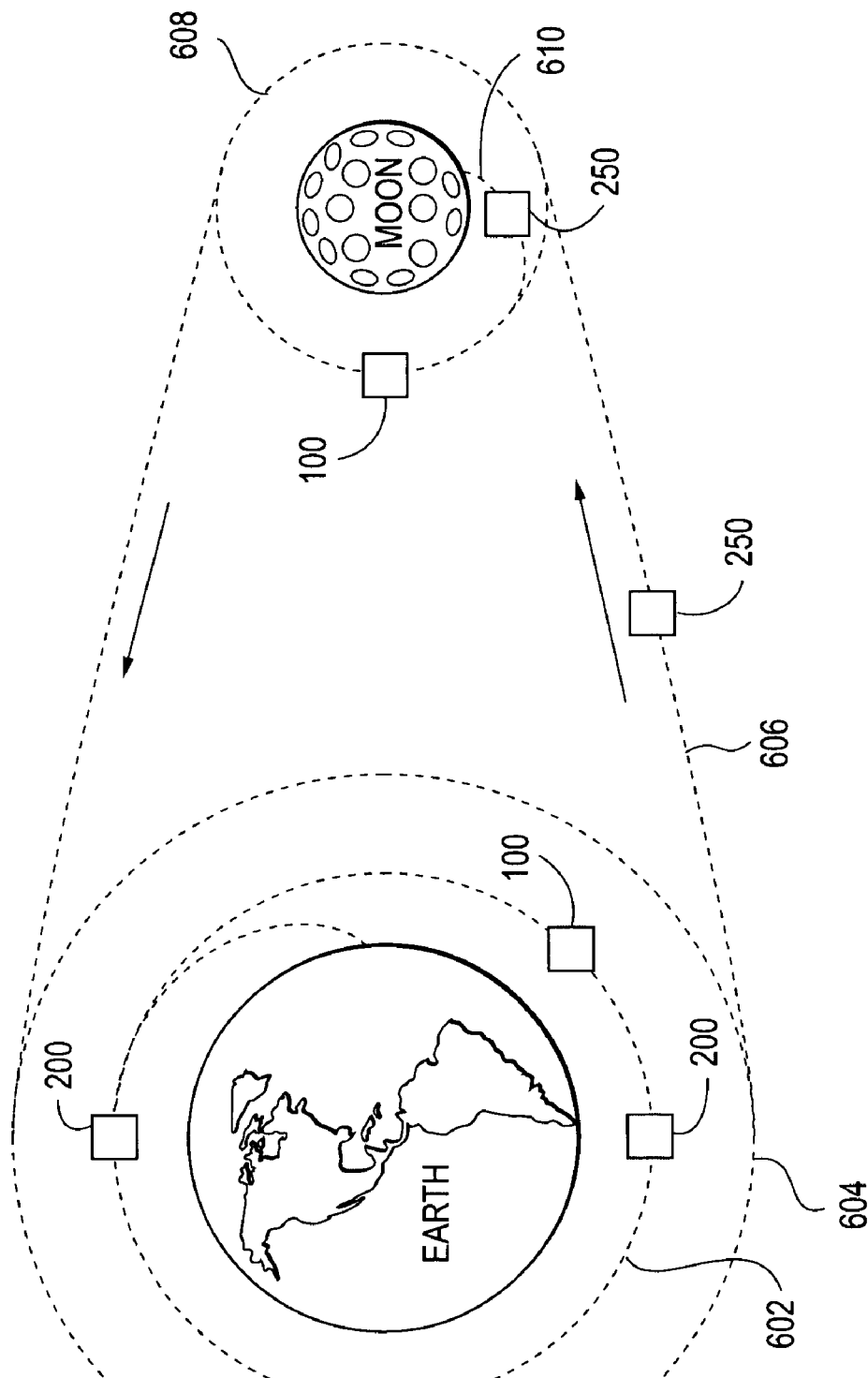
FIGS. 9A–9C illustrate various phases of the development of a lunar transportation system using the platforms of FIGS. 1–5 and the transportation node of FIG. 8.
Figure 9B:
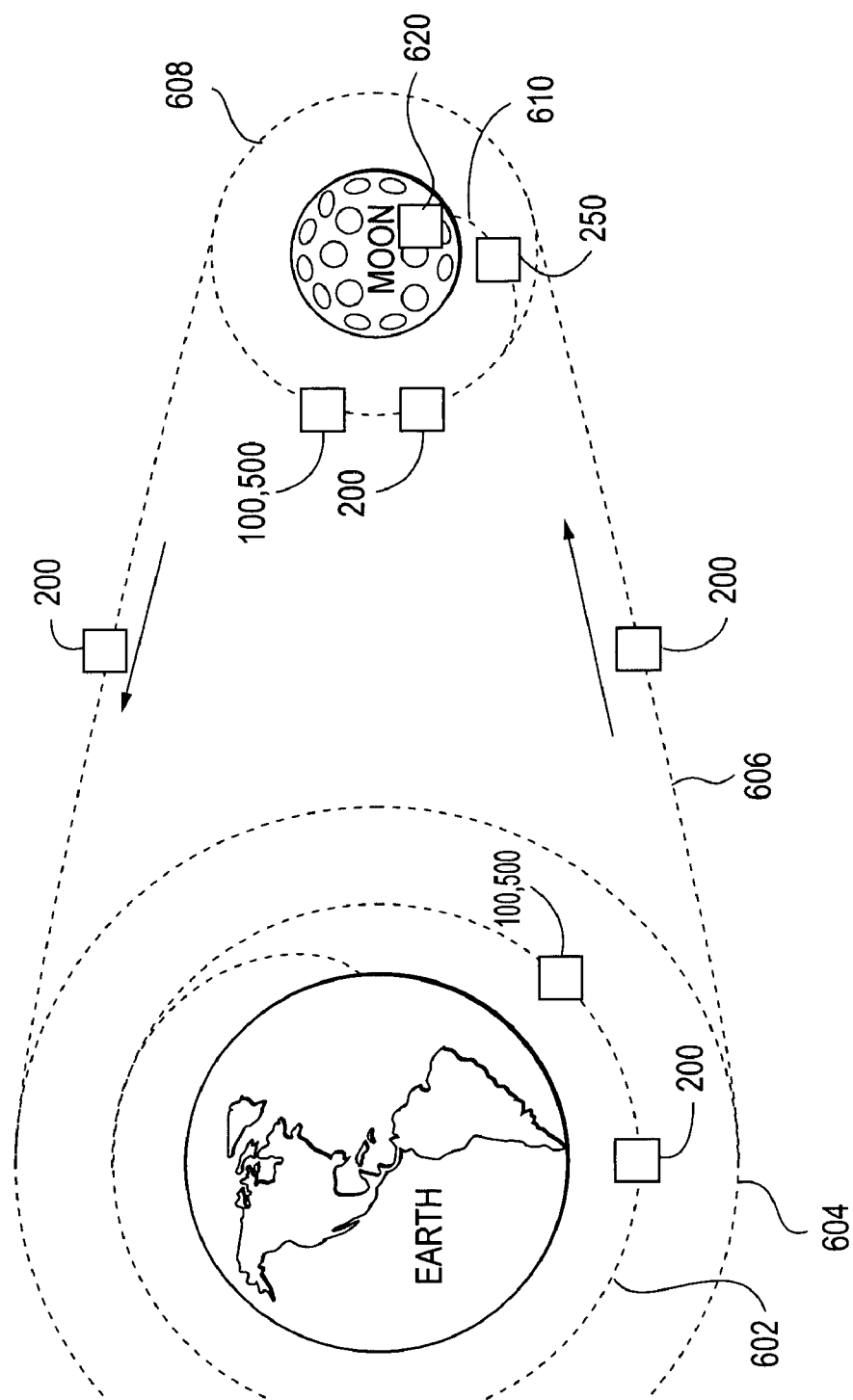
Figure 9C:
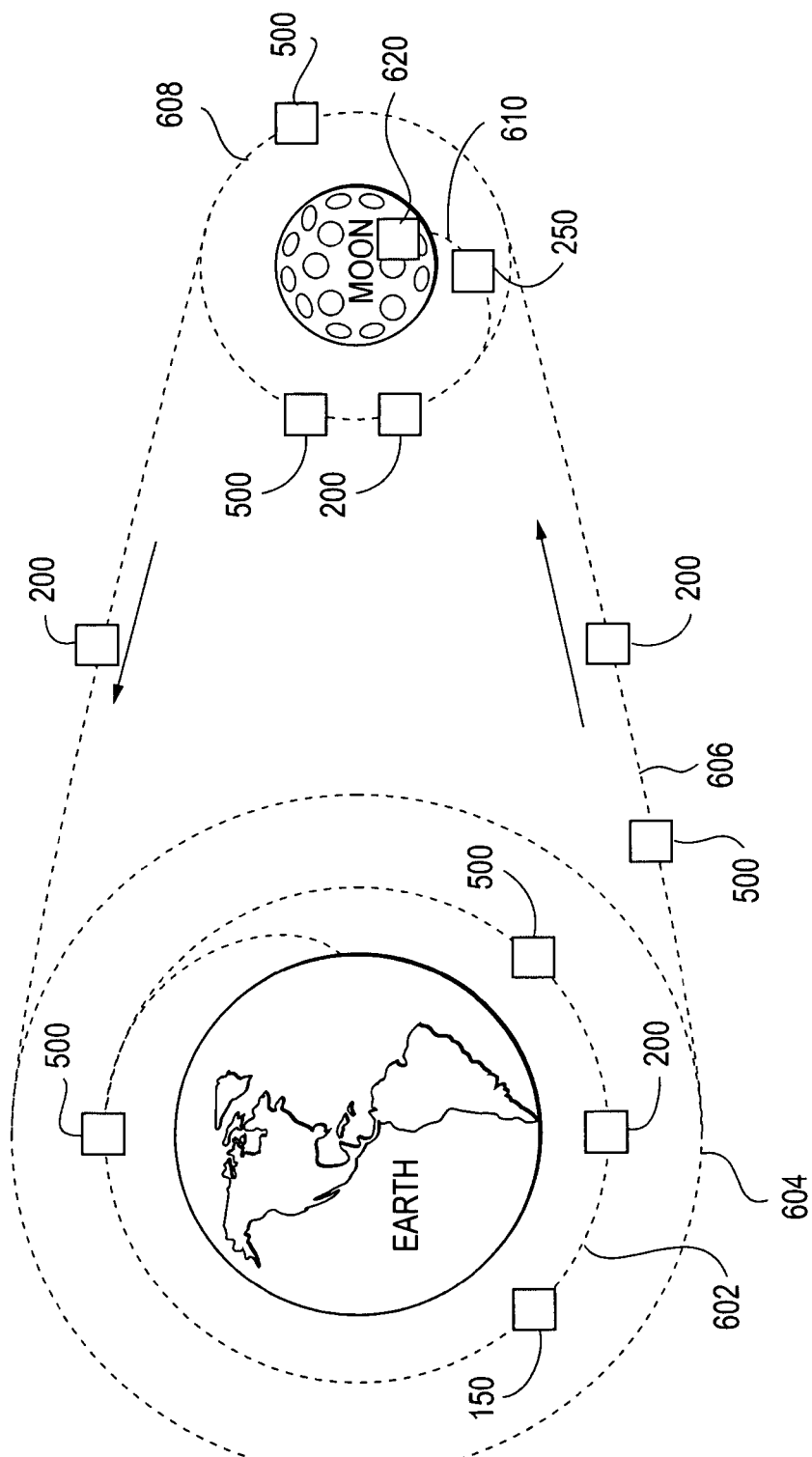

FIGS. 9A–9C illustrate various phases of the development of a lunar transportation system using platforms 100, 150, 200, 250 and transportation nodes 500. FIG. 9A illustrates an initial phase (Phase One) of the development of a lunar transportation system. Various platforms 100, 150, 200, 250 may be launched from earth using known launch techniques and vehicles, such as the space shuttle, and positioned in various orbits. In certain embodiments, a low earth orbit 602 is established by a storage platform 100 approximately 100 to 300 miles above the surface of earth. Later a geostationary orbit 604 may be established by a storage platform 100 approximately 25,000 miles above the surface of the earth. Other orbits and transportation nodes may be useful as the commercial lunar transportation system is matured. In Phase One, a transportation platform 200 may be launched from earth and directed along a lunar trajectory 606 towards the moon. Transportation platform 200 may rendezvous with one or more storage platforms 100 in low earth orbit 602 to obtain cargo and propellant required for the trip to the moon. In certain embodiments, during Phase One, transportation platform 200 is supplied with all the required cargo and propellant to reach the moon without the need to rendezvous with a storage platform 100 while on lunar trajectory 606.

In certain embodiments of Phase One, lunar landing platform 250 may also be launched from earth and rendezvous with one or more storage platforms 100 in low earth orbit 602 to receive the cargo and propellant necessary to fly to the moon and enter a lunar orbit 608. The location of potential lunar resources dictates a lunar landing trajectory 610 of lunar landing platform 250 from lunar orbit 608 to the surface of the moon. In certain embodiments of Phase One, minimum hardware includes one or two transportation platforms 200 and one storage platform 100 transported to low earth orbit 602. Various existing launch vehicles transporting the cargo into orbit may be required. Numerous storage platforms 100 may be positioned in various orbits around various celestial bodies to provide a logistics staging location to accomplish the lunar transportation system build-up.

FIG. 9B illustrates an intermediate phase (Phase Two) of the development of a lunar transportation system. Phase Two utilizes the space hardware used in Phase One as well as additional platforms 100, 150, 200, 250. In Phase Two, a transportation platform 200 is placed in a low earth orbit 602 and then proceeds past geostationary orbit 604 to lunar trajectory 606 toward the moon and enter lunar orbit 608. Transportation platform 200 then enters lunar orbit 608, where it rendezvous with a waiting storage platform 100 for the transfer of propellant and/or cargo. Storage platform has previously supplied a lunar landing platform 250 with propellant and/or cargo. Transportation platform 200 is restocked with propellant and carries additional empty propellant tanks 110, 120 on a return trip back to earth.

In certain embodiments, lunar landing platform 250 uses a lunar landing trajectory 610 to deliver cargo to the surface of the moon. In Phase Two, storage platform 100 may be modified with protective cover 152 designed to minimize the propellant boil-off to create platform 150. Storage platform 100 in low earth orbit 602 may be modified with a truss, one or more protective covers 152, and potentially with manned activities and facilities to create a transportation node 500.

Phase Two includes the use of one or more storage platforms 100 positioned in lunar orbit 608 and capable transferring all of the required propellant tanks 110, 120 to platforms 200, 250. In certain embodiments, during Phase Two, the storage platforms 100 positioned in lunar orbit 608 may be modified to create transportation node 500 in lunar orbit 608 in order to make the transportation hardware more effective and less expensive to use. Lunar landing platform 250 is used to place cargo on the surface of the moon from lunar orbit 608 using trajectory 610. Various lunar bases 620 may be located on the surface of the moon in proximity to locations of desired lunar resources.

FIG. 9C illustrates an advanced phase (Phase Three) of the development of a lunar transportation system. During Phase Three, large scale, far term lunar transportation development is supported through the transportation of significant cargo and logistics between the earth and the moon. Manned transportation nodes 500 may be placed in various orbits to provide supply support for the lunar transportation system. In certain embodiments of Phase Three, storage platforms 100 in low earth orbit 602 have been modified to create transportation nodes 500 (both manned and unmanned). Other storage platforms 100 may also be modified to create platforms 150 which include the ability to protect platforms 100 and their cargo from the extreme temperature environment of space. The number and locations of lunar bases 620 may also increase as more locations of lunar resources are discovered on the moon.

The goal of Phase Three is to further decrease the cost of transportation to the moon and back to earth, because the expenditures for hardware are justified by the increased transportation traffic and resource wealth created from obtaining resources from the moon. In certain embodiments, during Phase Three, transportation platforms 200 make regular trips to the moon from earth and carry potential lunar resources from the lunar bases 620 on a regular basis.

Although the present invention has been described with several embodiments, numerous changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A rack for storage of cargo in space, comprising:
    a plurality of tiers held in position by a central structure, each tier configured to releasably support at least one propellant tank, each tank contacting only a single surface of each tier and being held between two tiers; and a positioner configured to transfer a propellant tank to and from said frame.

2. The platform according to claim 1, wherein the plurality of propellant tanks include fuel tanks and oxidizer tanks.

3. The platform according to claim 1, wherein the weight of the empty platform is approximately less than ten percent of the weight of the propellant stored in the plurality of propellant tanks.

4. The platform according to claim 1, wherein each of the plurality of propellant tanks comprises an aluminum cylinder weighing approximately less than six percent of the propellant contained in the tank.

5. The platform according to claim 1, wherein a plurality of propellant tanks are releasably supported in spaces between said plurality of tiers.

6. The platform according to claim 1, wherein each of said plurality of tiers is a substantially circular disk.

7. The platform according to claim 1, wherein each of said plurality of tiers is connected to said central structure at predetermined spaced intervals.

8. The platform according to claim 7, further comprising a gripper connected to said central structure, said gripper being configured to hold a propellant tank in position.

9. The platform according to claim 7, wherein said gripper is configured to grip a band on a propellant tank.

10. The platform according to claim 8, further comprising a plurality of said grippers connected to said central structure.

11. The platform according to claim 1, further comprising a portion configured to support a payload.

12. The platform according to claim 1, further comprising a gripper configured to hold a propellant tank in position on at least one tier.

13. The platform according to claim 12, wherein said gripper is configured to grip a band on a propellant tank.

14. The platform according to claim 12, further comprising a plurality of said grippers.

15. The platform according to claim 1, wherein said positioner includes an end effector configured to grip a band on a propellant tank during transfer to and from each tier.

16. The platform according to claim 1, further comprising a plurality of said positioners.

17. The platform according to claim 16, wherein each of said plurality of positioners includes an end effector configured to grip a band on a propellant tank during transfer to and from each tier.

18. The platform according to claim 1, further comprising a movable radiation shield configured to shield a propellant tank in position on at least one tier.

19. The platform according to claim 18, wherein said movable radiation shield is movably mounted on at least one tier.

20. The platform according to claim 18, further comprising a plurality of said movable radiation shields.

21. The platform according to claim 1, further comprising an attitude control system including thrusters for positioning the platform.

22. The platform according to claim 1, further comprising a transfer interface through which propellant contained in a propellant tank releasably supported on at least one tier is transferred from the tank.

23. The platform according to claim 1, wherein the platform is a transportation platform for transportation and storage of cargo in space, the platform further comprising a motor for moving the platform through space.

24. The platform according to claim 23, wherein propellant contained in a propellant tank releasably supported on at least one tier is used for operating the motor.

25. The platform according to claim 24, further comprising a transfer interface through which propellant contained in a propellant tank releasably supported on at least one tier is transferred from the tank for use in operating the motor.

26. The platform according to claim 24, further comprising at least one landing leg to facilitate landing the platform on a surface.

27. The platform according to claim 24, wherein the platform is configured to transport cargo from an Earth orbit to lunar orbit.

28. The platform according to claim 1, further comprising a protective cover configured to protect a propellant tier in position on at least one frame.

29. The platform according to claim 1, wherein the platform is configured to be positioned in orbit around a celestial body.

30. The platform according to claim 1, further comprising:
 at least one directional alignment device;
 at least one directional movement device; and
 at least one fine adjustment self-sealing penetrator nozzle;
 wherein the directional alignment device, the directional movement device, and the fine adjustment self-sealing penetrator nozzle are operable to facilitate the precise positioning of the propellants tank on at least one tier.

31. The platform according to claim 1, further comprising at least one television camera operable to facilitate the precise positioning of the propellants tank on at least one tier.

32. A transportation node including a plurality of platforms according to claim 1.

33. The transportation node according to claim 32, wherein each of the plurality of platforms is coupled to a truss structure.

34. The transportation node according to claim 33, wherein the transportation node is a manned node which is configured to support an operator thereon.

35. The transportation node according to claim 32, wherein the transportation node is configured to be positioned in orbit around a celestial body.

36. The transportation node according to claim 35, wherein the transportation node is a gravity gradient stable structure having a longitudinal axis aligned with the center of the celestial body.

37. A system for transportation and storage of cargo in space, said system including a plurality of platforms, each platform comprising:
 a plurality of tiers held in position by a central structure, each tier configured to releasably support at least one propellant tank, each tank contacting only a single surface of each tier and being held between two tiers; and
 a positioner configured to transfer a propellant tank from a first tier of one of the plurality of platforms to a second tier of another of the plurality of platforms.

38. The system according to claim 37, wherein each of the plurality of platforms further comprises the plurality of said tiers, such that a plurality of propellant tanks are releasably supported in spaces between said plurality of tiers.

39. The system according to claim 38, wherein each of the plurality of platforms further comprises a central structure, each of said plurality of tiers being connected to said central structure at predetermined spaced intervals.

40. The system according to claim 39, wherein each of the plurality of platforms further comprises a gripper connected to said central structure, said gripper being configured to grip a band on a propellant tank in order to hold the propellant tank in position.

41. The system according to claim 37, wherein said positioner includes an end effector configured to grip a band on a propellant tank during transfer.

42. The system according to claim 37, wherein each of the plurality of platforms further comprises an attitude control system including thrusters for positioning the platform.

43. The system according to claim 37, wherein at least one of the plurality of platforms includes a motor for moving the platform through space.

44. The system according to claim 37, wherein at least one of the plurality of platforms includes at least one landing leg to facilitate landing the platform on a surface.

45. The system according to claim 37, wherein at least one of the plurality of platforms includes a radiation shield or cover to protect a propellant tank thereon.

46. The system according to claim 37, wherein at least one of the plurality of platforms includes coupling structure configured to temporarily connect the at least one platform to another of the plurality of platforms during transfer of a propellant tank.

47. The system according to claim 37, further comprising a truss structure, wherein each of the plurality of platforms is configured to be coupled to said truss structure.

48. A method for transportation and storage of cargo in space, comprising:
    providing a first platform and a second platform;
    holding a propellant tank on the first platform, the propellant tank contacting only a single surface of a tier on the first platform;
    positioning the first platform and the second platform adjacent to each other;
    coupling the first platform to the second platform;
    transferring the propellant tank from the first platform to the second platform;
    holding the propellant tank on the second platform, the propellant tank contacting only a single surface of a tier on the second platform; and
    uncoupling the first platform from the second platform.

49. The method according to claim 48, further comprising positioning the first platform or the second platform in orbit around a celestial body.

50. The method according to claim 48, further comprising transporting the first platform or the second platform from an Earth orbit to lunar orbit.

51. The method according to claim 48, further comprising connecting the first platform or the second platform to a truss structure.

52. The method according to claim 48, further comprising protecting the propellant tank from radiation with a shield provided on the first platform or the second platform.

53. The method according to claim 48, further comprising protecting the propellant tank from radiation with a cover provided on the first platform or the second platform.

54. The method according to claim 48, wherein the propellant tank is held on the first platform by a gripper.

55. The method according to claim 54, wherein the gripper grips a band on the propellant tank.

56. The method according to claim 48, wherein the propellant tank is held on the second platform by a gripper.

57. The method according to claim 56, wherein the gripper grips a band on the propellant tank.

58. The method according to claim 48, further comprising propelling the first platform or the second platform through space using a motor.

59. The method according to claim 48, further comprising powering the motor using propellant stored in the propellant tank.

60. The method according to claim 48, further comprising landing the first platform or the second platform on a surface.

61. The method according to claim 48, wherein the first platform and the second platform are positioned adjacent to each other using thrusters.

62. The method according to claim 48, wherein the first platform is coupled to the second platform by coupling structure provided on one of the first platform or the second platform.

63. The method according to claim 48, wherein the propellant tank is transferred from the first platform to the second platform by a movable positioner.

64. The method according to claim 63, the movable positioner includes an end effector which grips a band on the propellant tank.

* * * * *